United States Patent [19]

Jurca

[11] Patent Number: 4,949,263
[45] Date of Patent: Aug. 14, 1990

[54] LOAD HANDLING VEHICLE MONITORING SYSTEM

[75] Inventor: Zeljko T. Jurca, Etobicoke, Canada

[73] Assignee: Alert-o-Brake Systems Inc., Mississauga, Canada

[21] Appl. No.: 220,598

[22] Filed: Jul. 18, 1988

Related U.S. Application Data

[63] Continuation-in-part of Ser. No. 55,859, Jun. 1, 1987, Pat. No. 4,757,712.

[51] Int. Cl.⁵ ............................................. G04F 10/00
[52] U.S. Cl. .................................. 364/424.07; 377/16; 368/8; 364/424.04
[58] Field of Search ...................... 364/424.04, 424.07; 346/33 MC; 377/9, 19, 15, 16, 26; 368/8; 340/52 F, 685, 689

[56] References Cited

U.S. PATENT DOCUMENTS

| | | | |
|---|---|---|---|
| 4,258,421 | 3/1981 | Juhasz et al. | 364/424.04 |
| 4,395,624 | 7/1983 | Wartski | 377/15 |
| 4,511,974 | 4/1985 | Nakane et al. | 364/463 |
| 4,516,117 | 5/1985 | Couture et al. | 340/685 |
| 4,551,801 | 11/1985 | Sokol | 364/424.04 |
| 4,697,173 | 9/1987 | Stokes | 340/684 |
| 4,757,712 | 7/1988 | Jurca | 73/432.1 |
| 4,817,040 | 3/1989 | Bodley-Scott | 364/424.04 |
| 4,817,118 | 3/1989 | Wilburn et al. | 377/16 |

Primary Examiner—Thomas G. Black
Attorney, Agent, or Firm—Ridout & Maybee

[57] ABSTRACT

A monitoring system for a fork lift truck or other load handling vehicle comprises a plurality of transducers each assigned to detect a particular condition of vehicle usage; means for deriving from the transducers a plurality of binary signals each representative of the condition detected by a respective one of said transducers; and binary processing means including means for selectively gating the binary signals thereby to produce a plurality of sets of data each corresponding to a mode of vehicle usage represented by a respective combination of said signals. The sets of data are accumulated thereby to derive a count representative of the duration of each said mode of vehicle usage. The data read-out may be transmitted to a remove receive over an optical link.

13 Claims, 12 Drawing Sheets

LOAD HANDLING VEHICLE MONITORING SYSTEM

CROSS-REFERENCE TO RELATED APPLICATION

This application is a continuation-in-part of my co-pending application Ser. No. 055,859, now U.S. Pat. No. 4,757,712, filed on June 1, 1987 and entitled "Electric Monitoring System for Load Handling Vehicles".

FIELD OF THE INVENTION

This invention relates to an electric monitoring system for use in association with load handling vehicles such as for example, fork lift trucks.

Industrial trucks such as fork lift trucks, front end loaders, and the like, are special purpose vehicles designed to lift, transport and stack loads. Their economic utility in industry depends not only upon the extent to which they are used, but also upon the manner in which they are used. That is to say, it is important to know the extent to which the various capabilities of an industrial truck are utilized.

In my copending application Ser. No. 055,859 there is described a system for monitoring the pattern of usage of a load handling vehicle, such as an industrial truck. Basically, the system includes a plurality of transducers responsive to different physical operations of the vehicle, a plurality of timers each assigned to record a selected mode of vehicle usage, and gating circuitry interconnecting the timers with an electric supply, the gating circuitry including selector switches responsive to the transducers.

SUMMARY OF THE INVENTION

It is an object of the invention to provide an improved monitoring system for recording the pattern of usage of a load handling vehicle. As described in the above-identified application, the monitoring system basically comprises first transducer means for detecting the presence of a load applied to the vehicle; second transducer means for detecting motion of the vehicle; supply circuit means including an on-off switch operable to activate the monitoring system, said supply circuit means including a first timer responsive to operation of the on-off switch for timing the activation of the monitoring system; timer means including a plurality of further timers each assigned to record the duration of a selected mode of vehicle usage; and selective gating means interconnecting said further timers with said supply circuit means, the selective gating means being operable by the first and second transducer means for selectively activating the timers in accordance with the respective conditions of the transducer means, thereby to record the durations of said selected modes of vehicle usage. The selective gating means may comprise a set of two-state switches interconnected so as to effect selective gating of the signals derived from the transducers. The two-state switches may be solenoid-operated switches or solid-state switches.

The selective gating of the signals may be accomplished by binary signals processing. Thus, in a preferred embodiment of the invention the monitoring system comprises essentially supply circuit means including an on-off switch operable to activate the monitoring system; a plurality of transducers each assigned to detect a particular condition of vehicle usage; means for deriving from the transducers a plurality of binary signals each representative of the condition detected by a respective one of said transducers; binary processing means including means for selectively gating said binary signals thereby to produce a plurality of sets of data each corresponding to a mode of vehicle usage represented by a respective combination of said signals; means for accumulating said sets of data thereby to derive a count representative of the duration of each said mode of vehicle usage; output register means for storing said counts; read-out means coupled to said output register means; and control means for initiating downloading of the output register means to the read-out means.

The read-out means may advantageously include a data link, preferably an optical data link, for transmitting output data directly to a remote receiver positioned to receive the data when the vehicle is moved to an appropriate location.

These and other objects and advantages of the invention will become readily apparent from the following description of two preferred embodiments of the invention when considered in conjunction with the accompanying drawings.

BRIEF DESCRIPTION OF THE DRAWINGS

FIG. 6, consisting of 6a and 6b, is a schematic block diagram of the monitoring system represented in FIG. 5;

DESCRIPTION OF THE PREFERRED EMBODIMENTS

Figure 1:
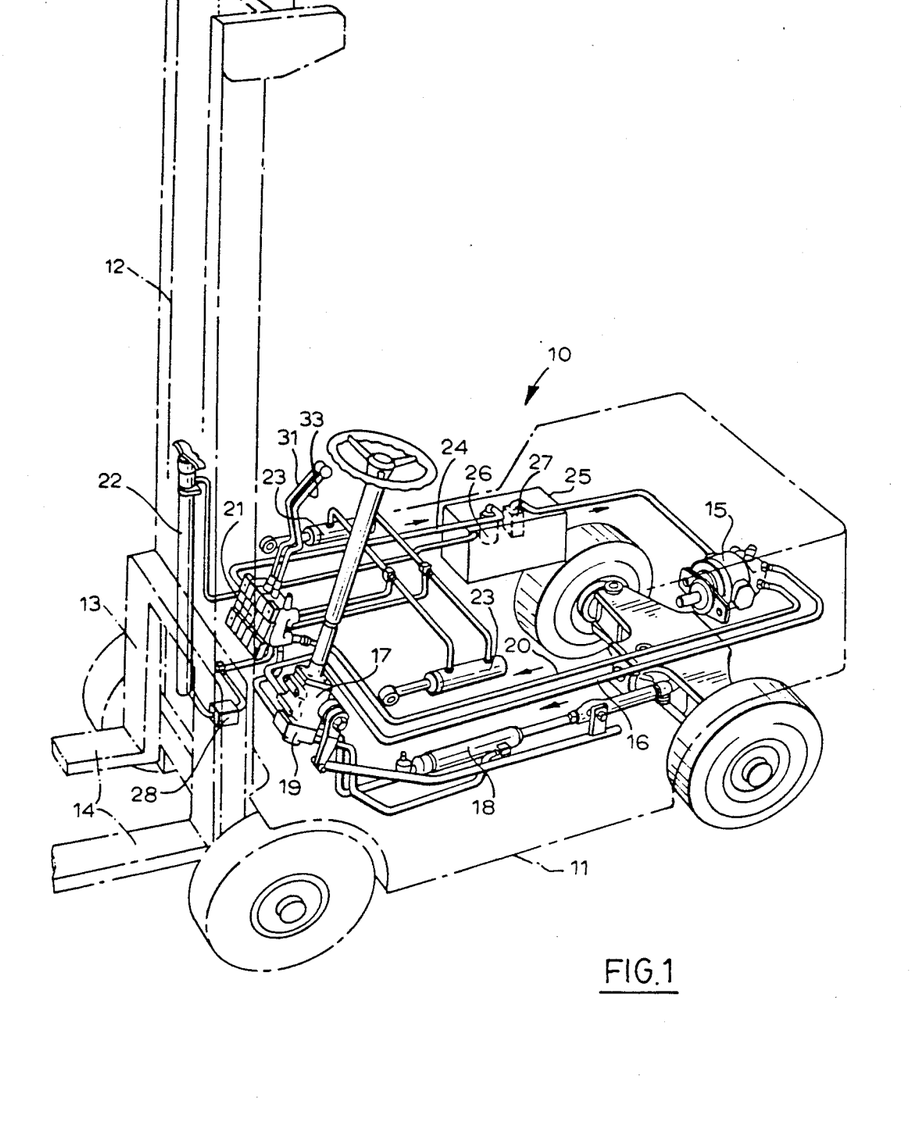
FIG. 1 shows the lay-out of the hydraulic system of a fork lift truck provided with a monitoring system according to the invention.

The fork lift truck 10 of FIG. 1 is representative of one type of load handling vehicle. The body 11 of the truck, the mast 12 and the fork lift 13 are shown in chain-dot outline so as not to obscure the hydraulic system which provides power for raising and lowering the fork lift 13, extending and retracting the fork arms 14, and tilting the mast 12 as may be required about a horizontal axis.

The hydraulic system comprises a hydraulic pump 15 which supplies fluid under pressure via a line 16 to a power steering control 17, which is interconnected with a power cylinder 18 via a control valve 19. The pump 15 also supplies fluid by way of a line 20 and a hydraulic control valve 21 to a lift cylinder 22 for raising and lowering the fork lift 13, and a pair of tilt cylinders 23 for tilting the mast 12. Fluid is returned to the pump 15 by way of a return line 24 and tank 25, the latter incorporating a return filter 26 and a suction strainer 27.

The hydraulic system thus described is conventional. However, for the purpose of monitoring usage of the fork lift, a pressure transducer 28 is provided at the inlet to the lift cylinder 22. The pressure transducer 28, which provides an electrical output signal corresponding to the pressure in the lift cylinder, may be of any suitable type, one suitable pressure transducer being the Barksdale Controls pressure transducer Model No. 300H213C604K. Instead of a pressure transducer, a load cell or like transducer may be used to detect the presence of a load on the fork lift.

Figure 2:
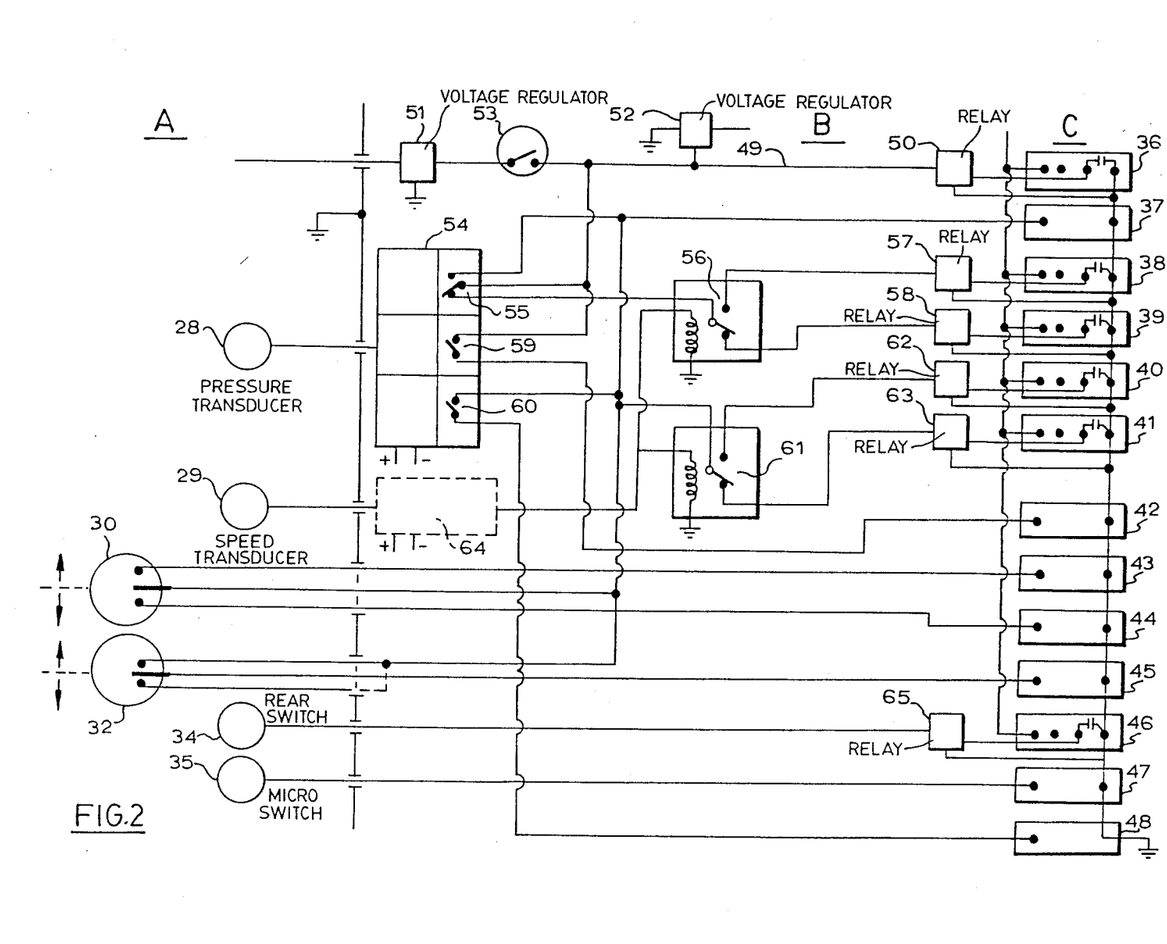
FIG. 2 is an electrical wiring diagram of the monitoring system.
Figure 3:
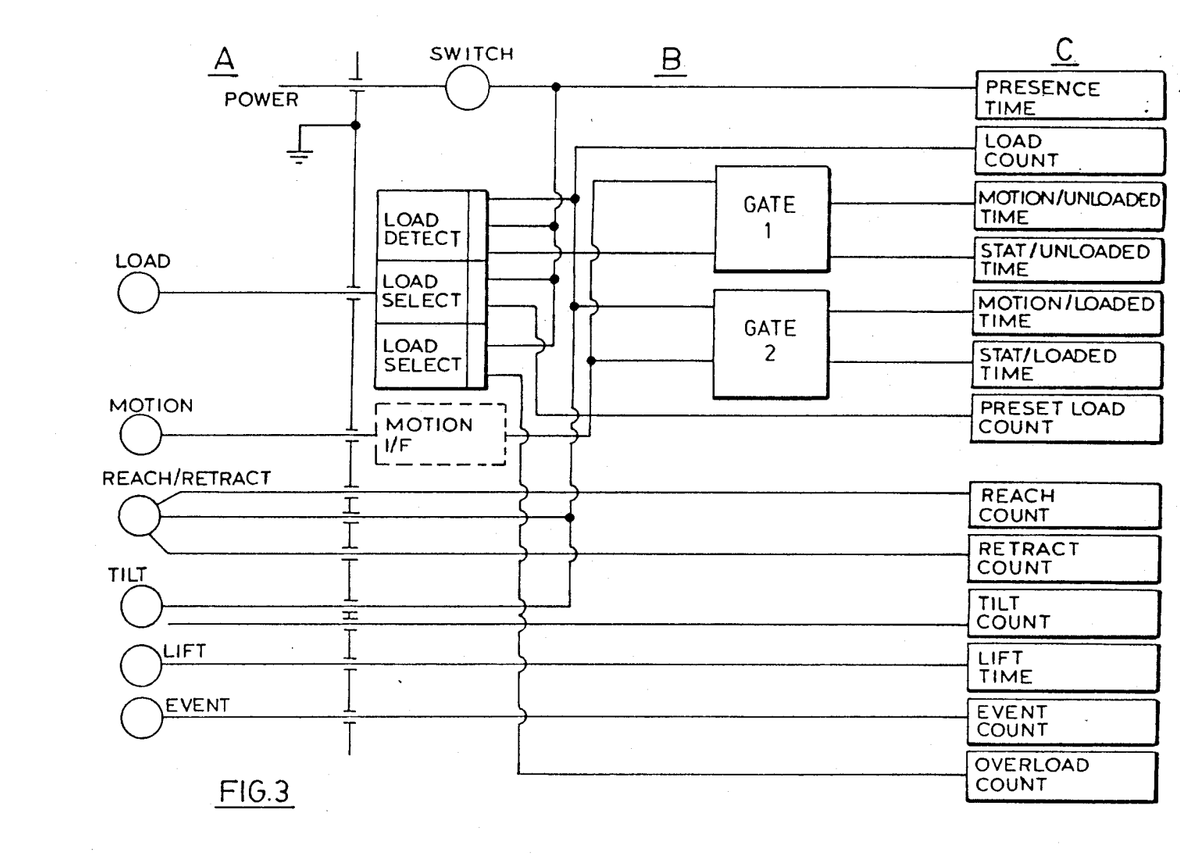
FIG. 3, consisting of A–C, is a block diagram showing the functional relationships of the components of the system.

Referring now to FIGS. 2 and 3, the monitoring system itself is made up of three basic parts, namely a set of transducers, switches or the like, generally denoted by the reference A, a set of timers and counters generally denoted by the reference C, and circuitry including gating means, denoted by the reference B, interconnecting the components A with the counters and timers C.

The transducers and switches of section A are suitably mounted on the truck to detect its various physical operations and produce signals in accordance therewith. Thus the pressure transducer 28, as previously mentioned, is fitted at the inlet to the lift cylinder and produces an electric signal representative of the pressure in the cylinder and hence the load applied to the vehicle. A speed transducer 29, which may be a generator driven by the truck wheels, is suitably mounted to detect motion of the truck by generating a signal in response to motion of the truck. A microswitch 30, operated by movements of the control lever 31 (FIG. 1) for extending and retracting the fork arms, is provided to detect such movements. A microswitch 32, operated by movements of the control lever 33 (FIG. 1) for tilting the mast 12, is provided to detect such movements. A reed switch 34 operated by lifting of the fork lift 13 (FIG. 1) remains closed for the whole of the lift time. In a case where the truck is adapted to be fitted with a special load handling attachment, a microswitch 35 is preferably mounted so as to be operated by the fitting of such attachment.

The timers and counters of Section C include a timer 36 for recording "presence time", that is to say, the duration of activation of the system; a counter 37 for counting and recording the number of applications of a load to the vehicle, as detected by the pressure transducer 28; a timer 38 for recording the time in which the truck is driven in an unloaded condition; a timer 39 for recording the time in which the truck is stationary in an unloaded condition; a timer 40 for recording the time in which the truck is driven in a loaded condition; and a timer 41 for recording the time in which the truck is stationary in a loaded condition. The section C also includes a counter 42 for recording the number of applications of loads in excess of a first predetermined value corresponding to a predetermined fraction of the specified maximum load; a counter 43 for recording the number of reach operations of the fork arms initiated by the control lever 31; a counter 44 for recording the number of retract operations of the fork arms initiated by the control lever 31; a counter 45 for recording the number of tilt operations of the mast 12 initiated by the control lever 33; a timer 46 for recording the total lift time in response to operation of the reed switch 34; a counter 47 for recording the number of "event" operations in response to the attachments of a special load handling appliance to the fork lift truck; and a counter 48 for recording the number of overloads, that is to say applications of a load to the truck in excess of the specified maximum load value.

Section B of the monitoring device provides a supply circuit 49 to which the timer circuit of the timer 36 is coupled by a relay 50. The supply circuit 49 is conveniently energized from a battery on the fork lift truck, and includes voltage regulators 51, 52 for maintaining a constant voltage. The supply circuit is activated by operation of an on-off switch 53, which an operator will turn on at the beginning of a working shift. The timer 36 is therefore responsive to operation of the switch 53 and so records the "presence time".

The timing circuits of timers 38, 39, 40 and 41 are interconnected with the pressure transducer 28 and the speed transducer 29 by way of gating circuitry which will now be described.

The pressure transducer 28, in response to the application of a load to the fork lift truck, actuates a selective switching means 54 including a first two-state switch 55 shown as a single-pole, double-throw switch. In FIG. 2 the switch 55 is shown in its normal, no-load condition. The common terminal of the switch 55 is connected to the supply circuit. One output terminal of the switch 55 is connected to the counter 37 while the other output terminal is connected to the common terminal of a second two-state switch 56. The output terminals of the switch 56 are connected respectively to the timer circuits of timers 38, 39 via relays 57, 58.

The two-state switch 55 is operated when a minimum load is applied to the truck. The switching means 54 also includes a first single-pole, single-throw switch 59 operable by the pressure transducer 28 in response to the application of a load exceeding a first predetermined value. A second single-pole, single-throw switch 60 is operable by the pressure transducer 28 in response to the application of a load exceeding a second predetermined value (specified maximum value) higher than the first.

When a load is applied to the vehicle, the switch 55 is operated so as to disconnect the switch 56 from the supply circuit 49 and to connect the common terminal of a third two-state switch 61 to the supply circuit. The output terminals of the switch 61 are connected respectively with the timer circuit of timers 40, 41 by way of relays 62, 63.

The switches 56 and 61, shown as single-pole, double-throw switches, are solenoid-operated switches responsive to the speed transducer 29 in accordance with the detection of vehicle motion. Depending upon the particular form of the transducer 29, an interface circuitry 64 between the speed transducer and the switches 56, 61 will usually be required.

The single-pole, double-throw switches 55, 56 and 61 thus constitute a first selective switching means operable in accordance with the presence of a vehicle load, and a second selective switching means operable by the detection of vehicle motion, the switches thus defining four different modes of usage of the fork lift truck, namely stationary/unloaded, stationary/loaded, driven/unloaded, and driven/loaded. The duration of each mode of usage is recorded by the respective one of the timers 38, 39, 40, 41 in accordance with the condition of the switches.

The switch 59, operable by the pressure transducer 28, is interconnected with the counter 42 which responds to the switch operation by recording the number of load applications in excess of the first predetermined value. Similarly, the switch 60, also operable by the pressure transducer 28, is interconnected with the counter 48 which responds to the switch operation by recording the number of load applications in excess of the specified maximum value.

The microswitch 30 is interconnected with the supply circuit 49 by way of the switch 55 when the truck is loaded, and is operable in accordance with extension and retraction of fork arms to activate a counter 43 for recording the number of reach operations or a counter 44 for recording the number of retract operations.

Similarly, the microswitch 32 is interconnected with the supply circuit 49 by way of the switch 55 when the truck is loaded, and with the counter 45. The counter 45 responds to operation of the microswitch 32, by recording the number of tilt operations performed on the mast 12.

The reed switch 34, operated by lifting of the fork lift, is used to close a circuit for activating the timer 46, for recording the total lift time. The timer 46 is coupled to the circuit via a relay 65.

The switching device 35, operable by the fitting of an optional load handling attachment, is used to actuate the counter 47 for recording the number of such fittings.

The components shown in Sections B and C of the monitoring system may conveniently be housed in a common housing to be mounted on the fork lift truck, the housing being provided with a connector socket carrying the electrical connections to the transducers and switches of Section A and to the truck power supply.

To sum up, the monitoring system when activated at the beginning of a working shift and deactivated at the end of the working shift, by operation of the on-off switch 53, records the pattern of truck usage during the shift.

Thus, the timers and counters show:
the "presence time", i.e. duration of the shift;
the "truck stationary and unloaded" time;
the "truck driven and unloaded" time;
the "truck driven and loaded" time;
the "truck stationary and loaded" time;
the number of load applications;
the number of applications of a load exceeding a predetermined amount;
the number of load applications exceeding a specified maximum load;
the number of "reach" operations;
the number of "retract" operations;
the number of "tilt" operations;
the number of "lift time";
the number of "event" activations.

It will be understood that some of these functions may be regarded as options, and will not be required in certain types of industrial truck other than fork lift trucks. However, it is to be understood that the invention in its broadest aspect, by providing the first five functions listed above, and preferably the first eight, can be used in association with a variety of load handling vehicles other than fork lift vehicles.

Preferably, a printer facility will be coupled to the monitoring system. This facility will include a central processing unit coupled to the system via a buffer interface for processing the signals applied to the timers and counters, as described hereinafter, and a printer controlled by the central processing unit for printing the respective readings of said timers and counters.

Figure 4:
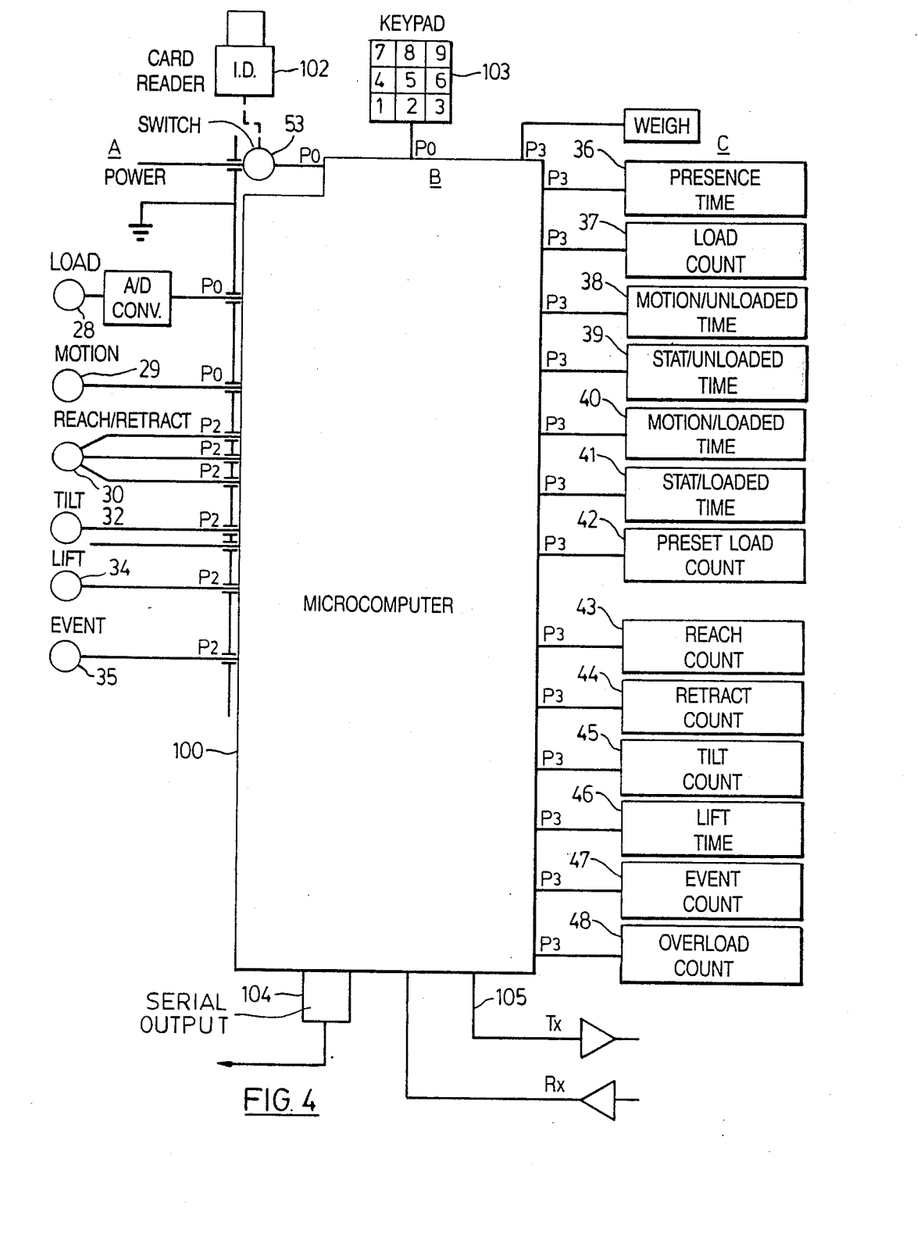
FIG. 4 is a schematic block diagram corresponding to FIG. 3, wherein a microcomputer is used for processing signals derived from the transducers.

FIG. 4 shows an alternative monitoring system in accordance with the invention, in which the selective gating of the signals from the transducers is achieved by binary signal processing instead of hard-wired switches. The layout of the system is drawn to correspond to that of the previous embodiment of the invention shown in FIGS. 2 and 3, and components which are common to the previous embodiment are denoted by the said reference numerals. The basic difference between the two embodiments is that the gating circuitry represented by Section B of FIGS. 2 and 3 is replaced by a microcomputer 100. The microcomputer, which may suitably be an Intel 8052 AH-BASIC chip, is programmed to perform all the gating, timing and counting functions previously described, but uses binary signal processing to achieve this. The microcomputer 100 has an input bus interfaced with the various input devices 28, 29, 30, 32, 34, 35, and an output bus interfaced with a liquid crystal display 101. Special features of the system, made possible by the use of a microcomputer include a card reader 102 for operating the on-off switch 53, a keypad 103 for manually entering data into the microcomputer 100, serial output means 104 for operating a printer mounted on the truck and serial output means 105 for transmitting information to a remote receiver over an optical data link. These features will be described in greater detail with reference to the subsequent figures of the drawings.

Figure 5:
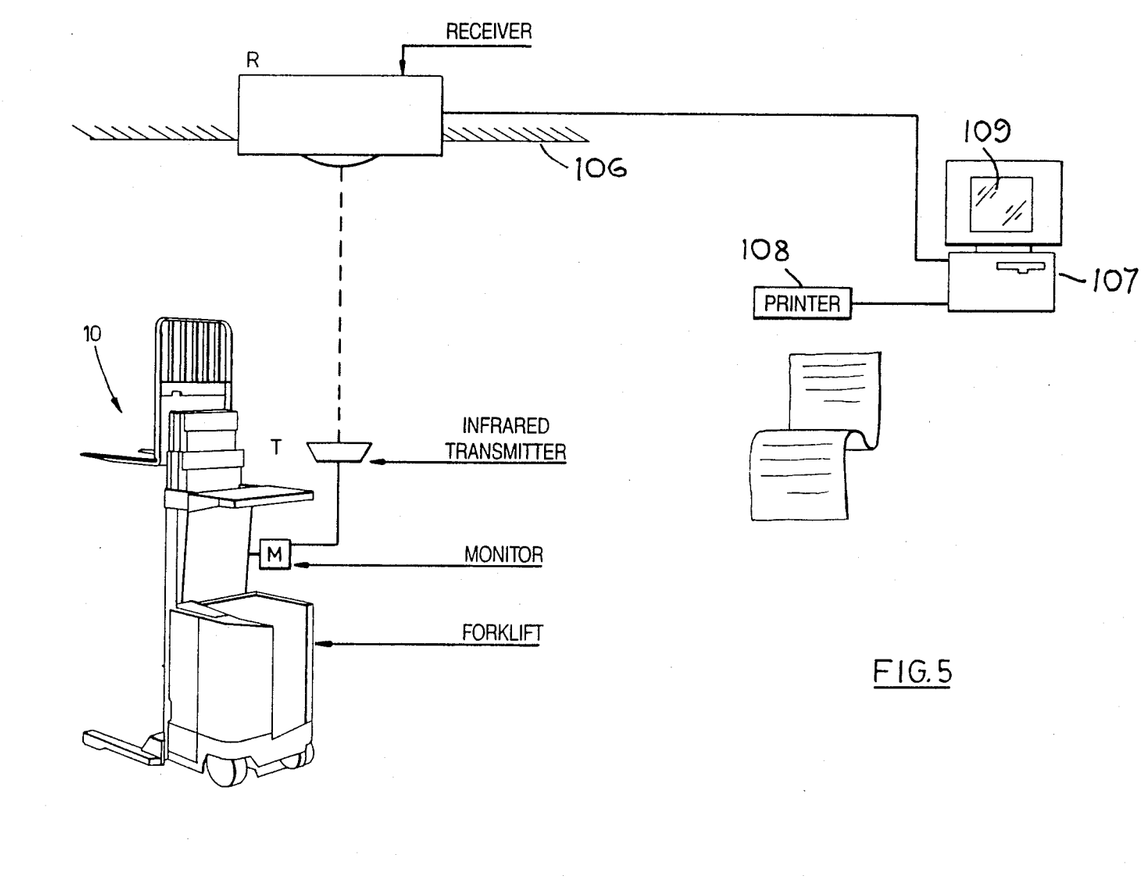
FIG. 5 is a schematic representation of a lift truck having a monitor capable of transmitting information to a remote receiver.

FIG. 5 is a simplified diagram showing the use of an optical data link with the monitoring system. The data link comprises an infra-red transmitter T, or rather a transponder, and an infra-red receiver R. The receiver R is fixedly mounted at a suitable location, for example in the ceiling 106 of a warehouse in which the truck 10 is to be used. The receiver R is interconnected with a computer 107 which is programmed to process data received by the receiver so that the information may be printed out on a printer 108 and displayed on a screen 109. The transmitter T of the optical data link is mounted on the truck 10 and is connected to a serial output of the microcomputer M for transmitting data when it is downloaded from the microcomputer. The orientations of the transmitter T and the receiver R are such that they are in optical alignment when the truck is moved to a given location, whereupon the data link is established. The receiver R includes, besides an infra-red receiving element, a transmitting element which projects a trigger signal in a predetermined downward direction such that, when the truck reaches the appropriate location in the warehouse so that the optical link is established, the downloading of data to the transmitter T is triggered. This and other operations will now be explained with reference to FIGS. 6 and 7.

Figure 6A:
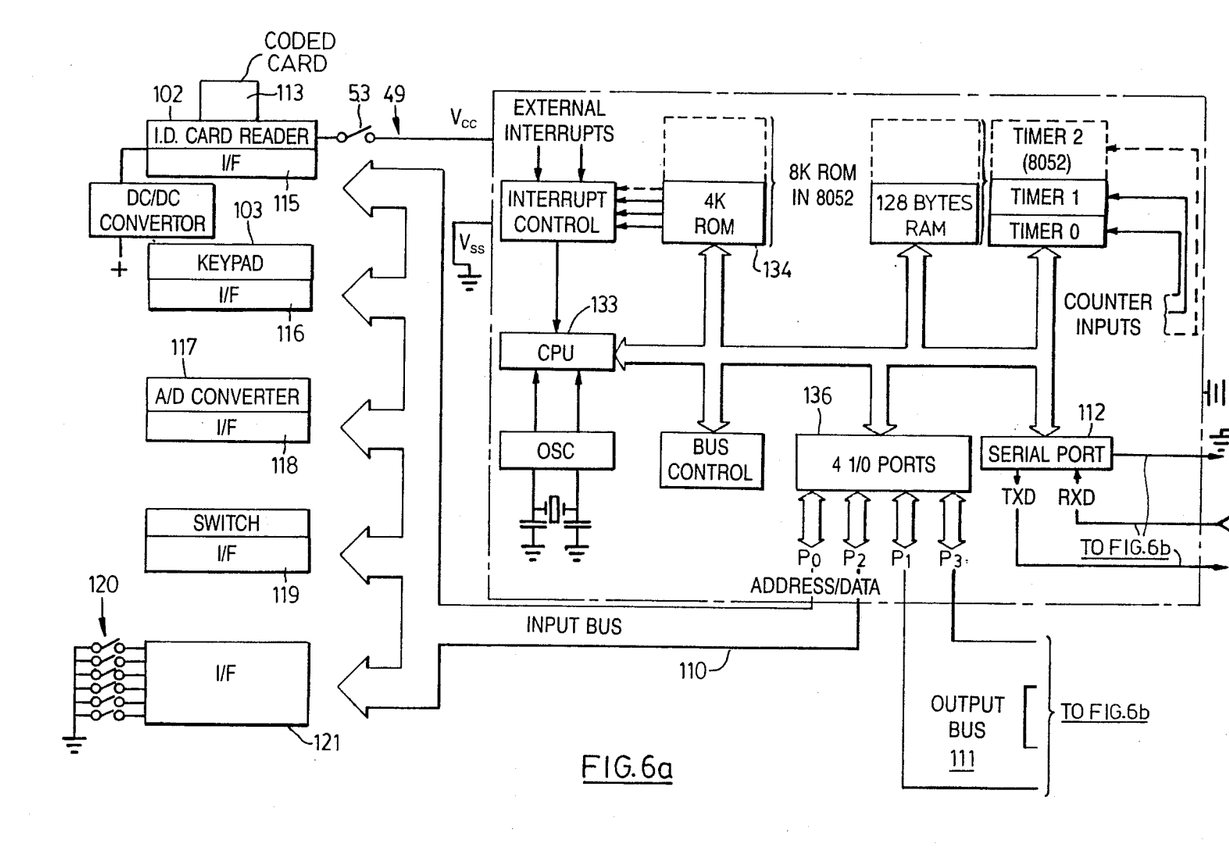
Figure 7A:
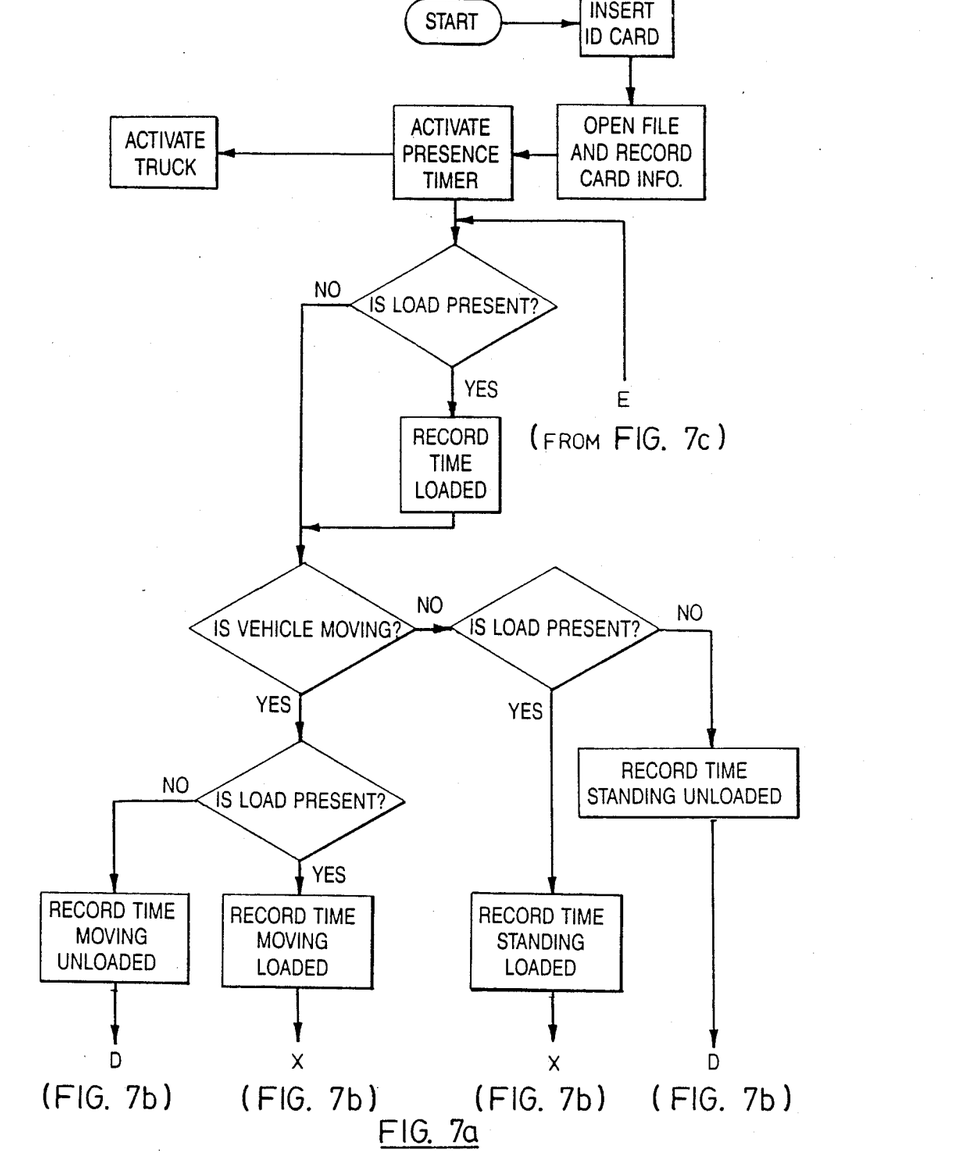
FIGS. 7a, 7b, 7c and 7d, considered together, constitute a flow chart for the programming of the microcomputer of FIG. 6.

FIG. 6 shows the microcomputer 100 which, as previously mentioned, is preferably an Intel 8052 AH-BASIC chip having an input bus 110, an output bus 111 and a serial output port 112. The supply circuit 49 for the system includes an on-off switch 53 operated by a card reader 102 to activate the system. In order to activate the system the operator must insert a coded card 113 into the card reader. Besides providing the appropriate activating code, the card will normally carry information such as operator identification. Such information is entered into the memory of the microcomputer and is displayed, but an important function of the code is to enable an output signal for operating the ignition switch 114 of the truck. Thus, a feature of this preferred embodiment is that the truck cannot be operated without the monitoring system being activated and without the operator being identified. The card reader 102 is connected to the input bus 110 by an interface 115.

The keypad 103 is connected to the input bus 110 via an interface 116. The keypad is used to enter data and commands into the microcomputer as hereinafter described. The load transducer 28, which may be a pressure transducer or other suitable load-responsive transducer as previously described, is connected to the input of an analog-digital converter 117 of any well known type for deriving a binary signal representative of the output signal from the transducer. The output of the analog-digital converter is connected to the input bus 110 via an interface 118. Thus the microcomputer will be informed not only whether a load is present, but also what the load is. The motion transducer 29 is connected to the input bus 10 via an interface 119. Finally, a set of switches denoted collectively by the reference numeral 120 but corresponding to the switches 30, 32, 34 and 35 of FIG. 2 and performing the same functions, are connected to the input bus 110 via an interface 121.

Connected to the output bus 111 of the microcomputer is the liquid crystal display 101 for displaying information stored in the microcomputer, or selected information, as required. Also connected to the output bus 111 via an output interface 123 is a status display panel providing status lights 124 for indicating the conditions under which the truck is currently operating.

The system provides a print-out facility which may be required in certain applications. For this purpose the printer 125 may be mounted on the truck itself and is connected to a driver 126 connected to the serial output 112 of the microcomputer. Print-out will be effected in response to the appropriate command.

Figure 6B:
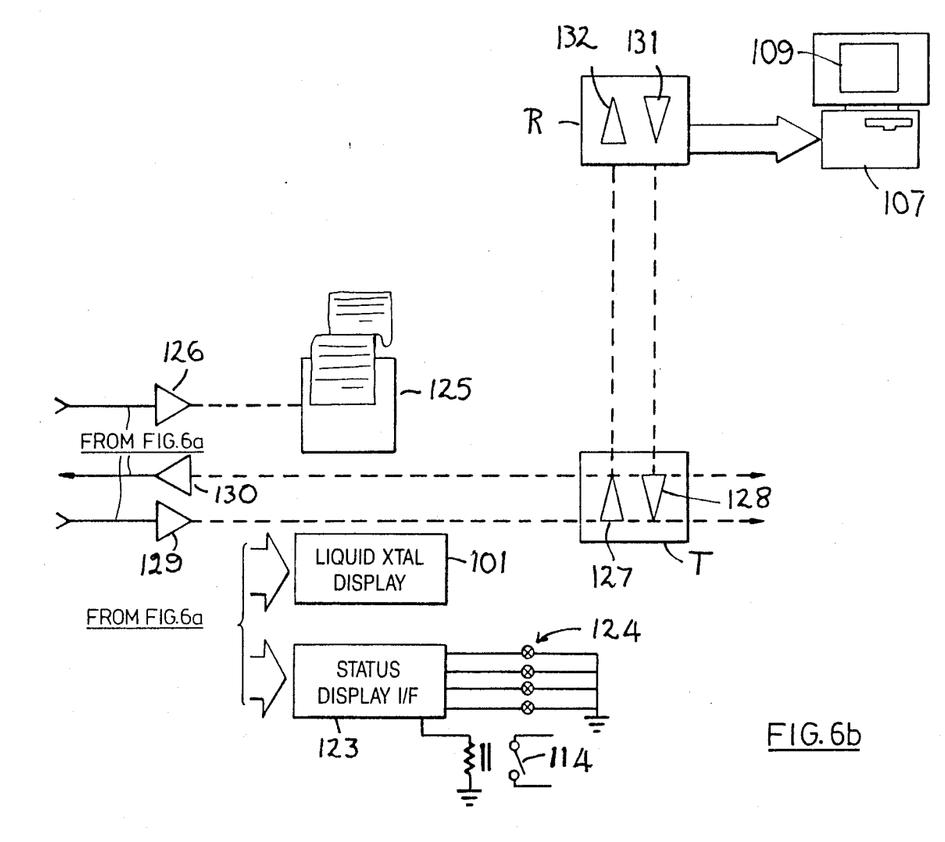

As already mentioned in connection with FIG. 5, the system provides an optical link to enable the transmission of information to a remote receiver in response to a trigger signal. The primary components of the data link are shown in FIG. 6. Thus, the transmitter T comprises an infra-red transmitting element 127 and an infra-red receiving element 128. The transmitting element 127 is driven from a driver 129 connected to the serial output 112 of the microcomputer, the read-out of the latter being responsive to receipt of a trigger signal when an input is applied via an input receiver 130 from the infra-red receiving element 128.

Similarly, the receiver R comprises an infra-red transmitting element 131 and an infra-red receiving element 132 which communicate with a remote computer over an RS232 link, for example. The transmitting element 131, controlled by the remote computer, beams an infra-red signal in a predetermined downward direction such that, when the truck is moved into a certain location bringing the transmitter T into optical alignment with the receiver R, the receiving element 128 senses the signal from the transmitting element 131 and sends a trigger signal to the microcomputer whereupon the stored information is read-out from the serial output 112 to the transmitter T. This information is accordingly transmitted from the transmitting element 127 to the receiving element 132 of the receiver R.

The microcomputer 100, which in the present example is an Intel 8051 AH-BASIC chip, and the peripheral components of the system, are well known. The operation of the monitoring system, based on the programming of the microcomputer, will now be described with reference to the flow chart of FIGS. 7a, 7b, 7c and 7d.

In order to start the truck the operator must insert a coded card into the card reader 102, thereby closing the on-off switch 53 to activate the system. The card will normally also contain, operator identification, this information is written into the memory of the microcomputer to be read out as required. With the application of power to the system, the CPU 133 of the microcomputer is reset and commences executing a program stored in the ROM 134. A file is opened for this new driving session and the information from the card is written into the RAM of the computer. At this point a timing cycle is initiated by setting up a counter to accumulate a count representing the duration of the driving session. This function, corresponding to the timer 36 of FIG. 2, is referred to herein as "Presence Timer". The status of I/0 ports 136, as determined by binary information derived from the keypad interface 116, the A/D converter interface 118, motion transducer interface 119 and event switches interface 121 are tested to determine:

(a) whether or not the forklift is lifting;
(b) whether or not the vehicle is moving;
(c) whether or not a load is present;
(d) whether or not the load exceeds a first predetermined value (overload);
(e) whether or not the load exceeds a second predetermined value (medium load);
(f) whether or not the load is to be weighed;
(g) whether a read-out of total load time is required;
(h) whether a print-out is required;
(i) whether or not any of the event switches 120 are ON;
(j) whether a print-out of file is required;
(k) whether a print-out of the preceding file is required; and
(l) whether or not the truck is at a location at which the optical data link can be established.

As is apparent from the flow chart of FIG. 7, the possible outcomes of these tests are as follows.

Thus, referring first to FIG. 7(a) particularly, if it is determined from test (a) that the forklift is lifting, from examination of the status of the appropriate event switch 120 (corresponding to switch 34 of FIG. 2), a timing cycle is initiated by setting up a counter to accumulate a count representing the duration of the lifting time. Thus the lifting time is recorded. Whether or not the forklift is lifting, test (b) is applied to determine whether the truck is moving. In addition, test (c) is applied to determine whether or not a load is present on the load carrier. In accordance with each of the four possible conditions determined by tests (b) and (c), namely MOVING TIME UNLOADED, MOVING TIME LOADED, STATIONARY TIME UNLOADED, STATIONARY TIME LOADED, a respective timing cycle is initiated by setting up a counter to accumulate a count representing the duration of that condition, the count being stored in an accumulator at the end of the condition These timing functions correspond respectively to the timers 38, 40, 39 and 41 of FIG. 2.

Figure 7B:
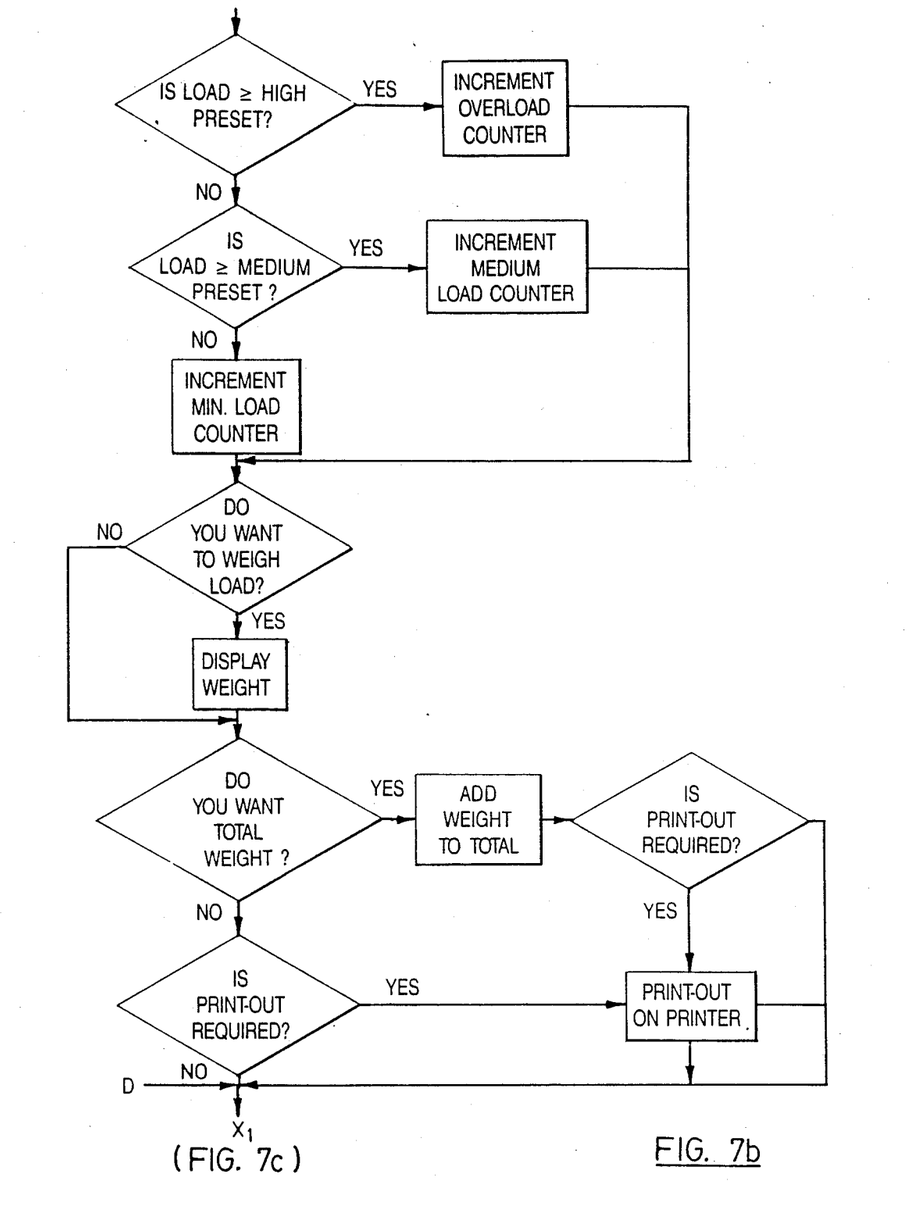

Referring now to FIG. 7b, if it is determined from test (c) that a load is present, test (d) is applied to determine whether the load exceeds a first predetermined value representing a maximum load. If the answer is positive, an overload counter corresponding to counter 48 of FIG. 2 is incremented. If, however, the answer is negative, test (e) is applied to determine whether the load exceeds a second predetermined value representing an intermediate load. If the answer is positive, a preset load counter corresponding to counter 42 of FIG. 2 is incremented. If the answer is negative, a minimum load counter is incremented. At any time the contents of the three load counters may be summed to provide a total of the load applications during the driving session, thus providing the function of counter 37 in FIG. 2.

If a load is present, test (f) is applied. That is to say, the status of the appropriate input port is tested to determine whether the operator has requested a weight measurement of the load by inserting an appropriate code via the keypad 103. If the answer is positive, the weight of the load is displayed on the liquid crystal display 101. In this connection, the A/D converter interface produces a binary signal corresponding to the weight of the load as determined by the load transducer 28, the microcomputer being programmed in the conventional way to store that information which is read out via the output bus 111 upon command. In addition, whether or not a weight measurement is required, test (g) is applied to determine whether the operator has requested a total or a subtotal. If the answer is positive, the weight is added to the total or the temporary total. In any event, test (h) is applied to determine whether a print-out is required and, if the answer is positive, the information is read out from the serial port 112 and printed by printer 125.

Figure 7C:
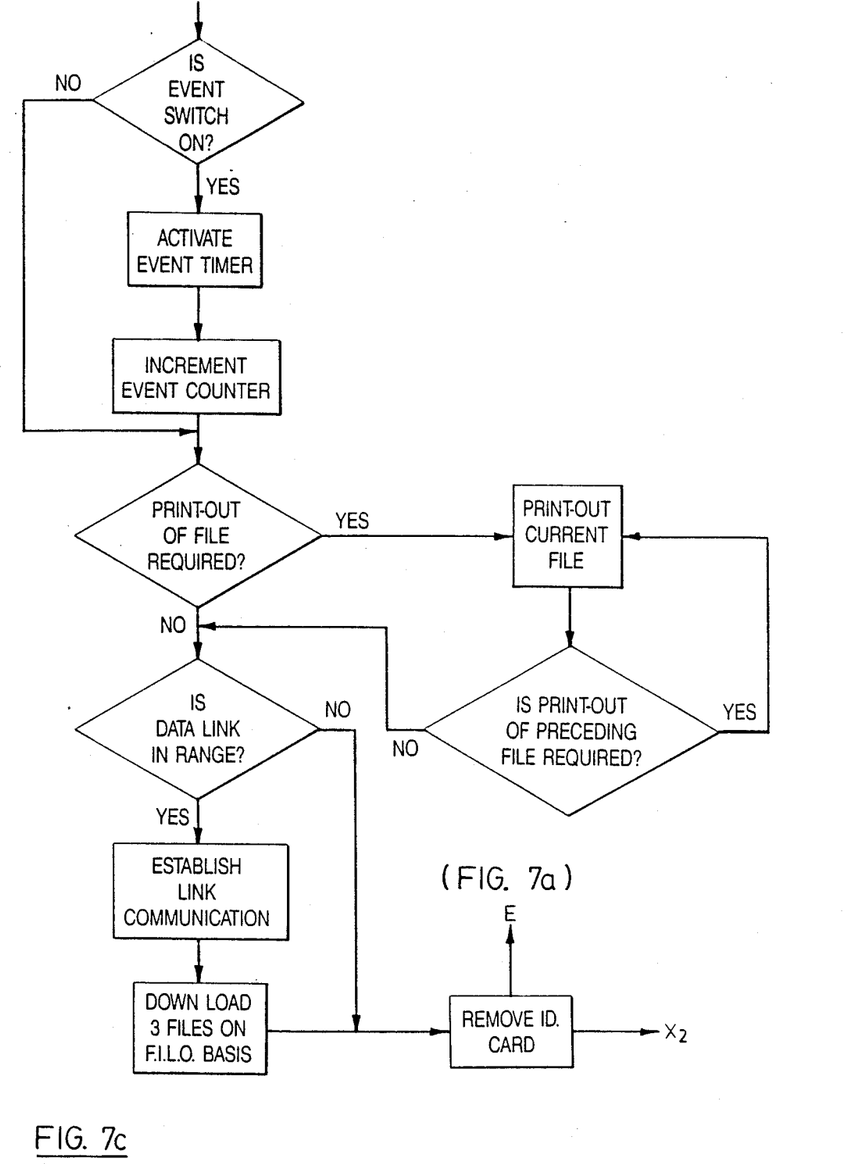

Referring now to FIG. 7c, test (i) is applied to each of the appropriate I/O ports in turn to determine whether any of the event switches are ON. For each event switch that is ON, a timing cycle is initiated by setting up a counter to accumulate a count corresponding to the ON period of that particular event switch. In addition, an event counter corresponding to the counter 47 of FIG. 2, for example, is incremented.

From test (i) the program proceeds to test (j) to determine whether a print-out of the file is required as determined by the status of an I/O port connected to the keypad interface 116. If the answer is positive, the file information is printed out by printer 125, the data being read from the serial output 112. Test (k) is also applied and, if required by the operator, one, two or more preceding files will also be printed out by printer 125.

Figure 7D:
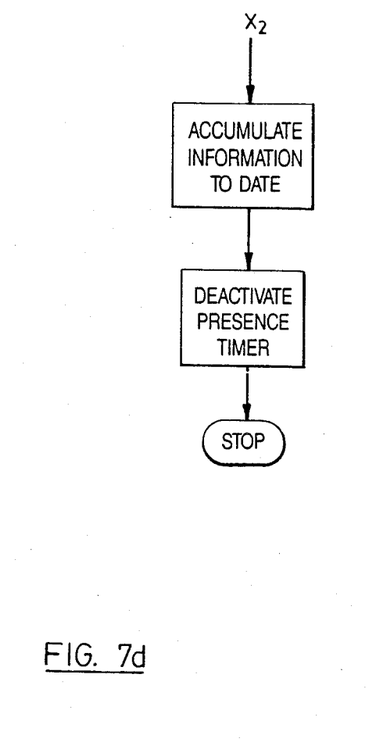

An advantageous feature of the present invention is provided by test (1) of the program, to determine whether the truck is at a location such that the transmitter T is in optical alignment with the remote receiver R. If such is the case, the optical data link is established by receipt of an infra-red signal or beam, whereupon a trigger signal from the transmitter T sets up a command in the microcomputer causing the latter to download the three most recent files on a "first in last out" basis. This information is transmitted to the receiver R over the optical data link.

The final test is to determine whether the ID card is still in the card reader 102. If the card has been removed, the presence timer is deactivated and all the information derived from the driving session just ended is stored in the memory of the microcomputer for future reference. If the test determines that the card is still present, the program returns to point E in FIG. 7a and repeats the cycle until the card is removed.

Figure 8:
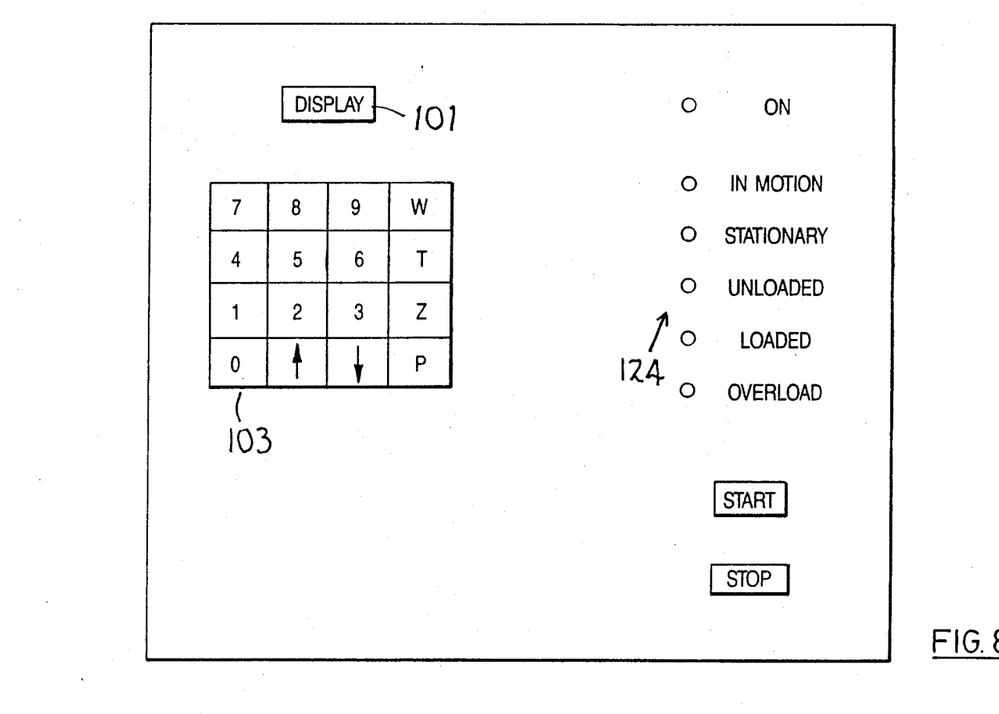
FIG. 8 illustrates the keypad of FIG. 6 in greater detail.

FIG. 8 illustrates the lay-out of the operator's control panel. The panel provides a liquid crystal display 101 for displaying information into the microcomputer and also output information when requested by the operator. The input information will include information from the card when it is inserted into the card reader 102 (FIG. 4). The operator may enter commands and values such as load criteria from the keypad 103, which has numbered keys and specific function keys identified by the letters W (load weight requested), T (total requested), Z (zero or reset) and P (print-out). Six status indicator lights 124, connected to the output interface of the microcomputer are provided to show the conditions under which the truck is currently working. The lights are labelled "ON", "IN MOTION", "STATIONARY", "UNLOADED", "LOADED", and "OVERLOADED".

We claim:

1. An electric monitoring system for use in association with a load handling vehicle to record the pattern of vehicle usage, comprising:
   first transducer means for detecting the presence of a load applied to the vehicle;
   second transducer means for detecting motion of the vehicle,
   supply circuit means including an on-off switch operable to activate the monitoring system, said supply circuit means including a first timer responsive to operation of the on-off switch for timing the activation of the monitoring system;
   timer means including a plurality of further timers each assigned to record the duration of a selected mode of vehicle usage; and
   selective gating means interconnecting said further timers with said supply circuit means, the selective gating means being operable by the first and second transducer means for selectively activating the timers in accordance with the respective conditions of the transducer means, thereby to record the durations of said selected modes of vehicle usage.

2. An electric monitoring system according to claim 1, further comprising
   storage means for storing said recorded durations of selected modes of vehicle usage;
   read-out means coupled to said storage means; and
   control means for initiating the read-out of information from said storage means.

3. An electric monitoring system according to claim 1, wherein the read-out means includes a data link comprising a transmitter mounted on the vehicle and a receiver mounted independently of the vehicle at a position to receive information transmitted by the transmitter.

4. An electric monitoring system according to claim 3, wherein the data link is an optical data link, including means responsive to optical alignment of the transmitter with the receiver, said control means being activated to initiate the read-out of information from said storage means in response to the transmitter becoming optically aligned with the receiver.

5. An electric monitoring system according to claim 4, wherein the on-off switch of the supply circuit means is a card-operated switch.

6. In combination with a load handling vehicle having a load carrier, an electric monitoring system for recording the pattern of vehicle usage comprising
   supply circuit means including an on-off switch operable to activate the monitoring system;
   timer means responsive to operation of the on-off switch for timing the activation of the monitoring system;
   a plurality of transducers each assigned to detect a particular condition of vehicle usage, namely a first transducer responsive to the presence of a load applied to the load carrier for producing a first signal in accordance therewith, and a second transducer responsive to motion of the vehicle for producing a second signal in accordance therewith;

means for deriving from the transducers a plurality of binary signals each representative of the condition detected by a respective one of said transducers;

binary processing means including means for selectively gating said binary signals thereby to produce a plurality of sets of data each corresponding to a mode of vehicle usage represented by a respective combination of said signals;

means for accumulating said sets of data thereby to derive a count representative of the duration of each said mode of vehicle usage;

output register means for storing said counts;

read-out means coupled to said output register means; and control means for initiating downloading of the output register means to the read-out means.

7. The combination claimed in claim 2, wherein said means for deriving a plurality of binary signals from the first and second transducers comprises means for discriminating between different levels of said first signal to produce binary signals representative of different loading conditions, namely "Load Absent", "Load Present" and "Overload" respectively.

8. The combination claimed in claim 7, wherein the binary processing means further comprises means responsive to said load-representative binary signals for counting the number of "Load Present" occurrences and the number of "Overload" occurrences.

9. The combination claimed in claim 6, wherein the read-out means includes a data link comprising a transmitter mounted on the vehicle, the transmitter being connected to a serial output of the binary processing means, and a receiver mounted independently of the vehicle at a position to receive output data from the transmitter.

10. The combination claimed in claim 9, wherein the data link is an optical data link, said control means being activated to initiate downloading of the output register means to the data link in response to the transmitter becoming optically aligned with the receiver.

11. The combination claimed in claim 6, wherein the read-out means includes a printer mounted on the vehicle and connected to a serial output of the binary processing means.

12. The combination claimed in claim 6, wherein the read-out means includes a liquid crystal display connected to an output bus of the binary processing means.

13. The combination claimed in claim 6, wherein the on-off switch of the supply circuit means is a card-operated switch.

* * * * *